Patented Dec. 2, 1952

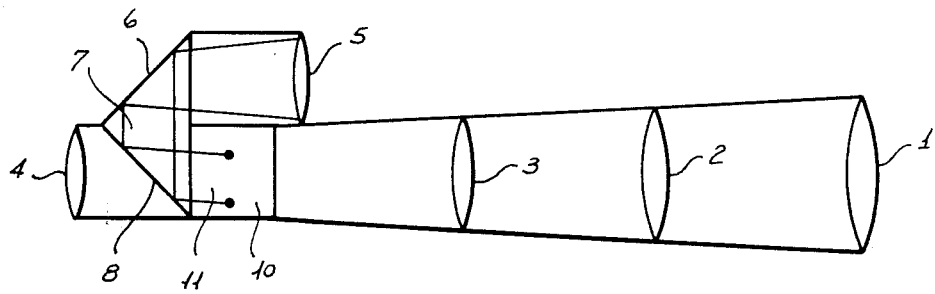
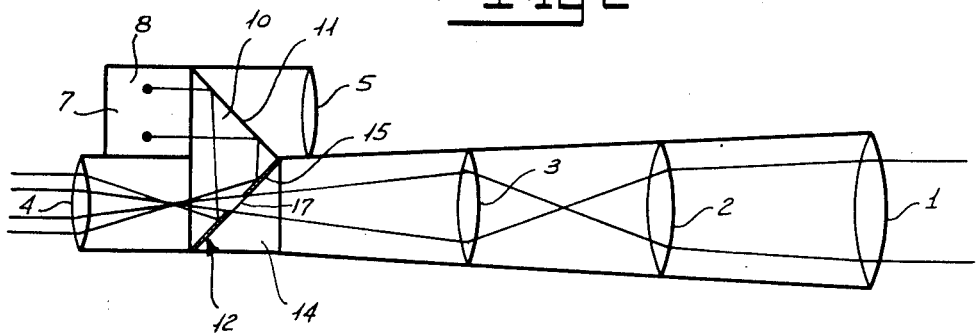
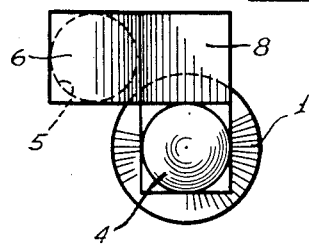
INVENTOR
ERIK LENNART LANE

2,619,874

UNITED STATES PATENT OFFICE 2,619,874

TELESCOPE AND VIEW FINDER WITH PRISMATIC OPTICAL SYSTEM

Erik Lennart Lane, Stockholm, Sweden

Original application June 18, 1948, Serial No. 33,705. Divided and this application April 18, 1951, Serial No. 221,567. In Sweden June 18, 1947

1 Claim. (Cl. 88—33)

This invention relates to telescopes having a finder and has for an object to provide a reflecting system for the telescope and finder having novel and improved characteristics.

This application is a division of my co-pending application Serial No. 33,705 filed June 18, 1948 for Telescope Systems (now abandoned).

In telescope systems comprising a highly magnifying telescope having a small field of view and a finder with low magnification and large field of view, it is preferred that the telescope and the finder have a mutual ocular, and that the images produced by the telescope objective and the finder objective be directed to the same optical axis by means of reflecting surfaces.

The telescope system according to this invention consists of a telescope and a finder with a mutual ocular, and its chief feature is that the images produced by the telescope objective and the finder objective are directed to the same optical axis by means of two pairs of reflecting surfaces, the planes of which are in pairs which form the same angle with said axis, for instance the reflecting surfaces of a rhomboid prism or of a Porro prism, whereby the rays from one of the objectives are parallelly displaced and also allowed free passage to each reflecting surface.

The invention is illustrated on the annexed drawing, wherein:

Fig. 1 is a top plan view of a telescope system with four reflecting surfaces parallelly displacing the rays of the finder objective;

Fig. 2 is a side elevation thereof; and

Fig. 3 is an end elevation thereof viewed from the ocular end of the telescope.

Referring to the drawing, the telescope includes an objective 1 disposed to condense rays from a distant source and focus the same through erecting lenses 2 and 3 onto an ocular 4. The finder includes an objective 5 disposed at one side of the telescope and adapted to receive and condense rays from a distant source onto a reflecting surface 6 of a prism 7 having a second reflecting surface 8. The surfaces 6 and 8 are arranged at an angle of 45° with respect to the axis of the incoming rays and produce a 90° reflection of the rays at each surface so that the rays leaving the surface 8 have been reflected 180° and extend above and parallel to the axis of the telescope. A second prism 10 having 45° reflecting surfaces 11 and 12 receives the rays from the first prism 7 and reflects them through 180° onto the ocular 4. The adjacent surfaces of the two prisms are in direct contact so as to avoid air interfaces and the second reflecting surface 12 of the prism 10 is disposed in the path of the direct rays from the objective 1 of the telescope. The objective 1 forms a highly magnifying telescope with a small field and the objective 5 forms a finder of low magnification and wide field. Both images are superimposed on the ocular.

Adjacent the prism surface 12 there has been placed a body 14 of the same optical density as the prism and with a plane surface 15 which forms a right angle to the optical axis of the telescope objective, the rays from the telescope objective thus being allowed to pass through the surface 12 without deflection.

When adjusting for different distances, it is preferable that not only the ocular, but also the finder objective be displaced relatively to the telescope objective because the images produced by both objectives will in this way maintain their mutual positions.

The focal distances of the telescope objective 1 and the finder objective 5 are preferably chosen so that the rays coming from both objectives are directed approximately to the same point in the focal plane of the ocular lens 4.

The reflecting prism surface, which is located in the place where rays from both objectives meet, is preferably provided with a specular coating 15 of such an extent that the coated part of the prism surface has an opening 17 for the passage of the rays from the objective 1.

In the embodiment illustrated the reflecting prism surface 12 may be replaced by a mirror having an opening to pass the telescope rays in order to avoid loss of light for the telescope rays.

What is claimed is:

A telescoping system comprising finder and telescope objectives with different focal distances and one ocular, said finder objective having its optical axis parallel with and displaced from the axis of said ocular and said telescope objective having its optical axis coinciding with the axis of said ocular, and a reflecting system consisting of two prisms, each having a pair of reflecting surfaces, each of which is disposed at an angle of 45° with said axis and arranged in sequence, the first of said prisms having a reflecting surface disposed in the path of the rays from said finder objective to reflect said rays through 90° and the second of said prisms having a reflecting surface disposed in the path of the rays from said telescope objective and positioned to reflect the rays from said finder objective to said ocular along a path coincident with the rays from said telescope objective, said last mentioned surface having a transparent area disposed to pass the rays from said telescope objective without reflection and being positioned at a point where the rays from said telescope objective are condensed to an area less than the area of the rays from said finder objective whereby the finder rays are reflected around the periphery of the rays from said telescope objective, and a body of the same optical density as said prisms disposed against the last mentioned prism surface located in the place where rays from both objectives meet and having a plane surface which forms a right angle with the optical axis of said ocular whereby the rays from said telescope objective pass through said second prism and said body to said ocular without deflection.

ERIK LENNART LANE.

REFERENCES CITED

The following references are of record in the file of this patent:

UNITED STATES PATENTS

| Number    | Name    | Date          |
|-----------|---------|---------------|
| 1,290,777 | O'Brien | Jan. 7, 1919  |
| 2,244,505 | Sauer   | June 3, 1941  |
| 2,409,186 | Bouwers | Oct. 15, 1946 |